Sept. 17, 1940.  H. S. TURNER  2,214,843
THERMOSTAT
Filed May 11, 1939
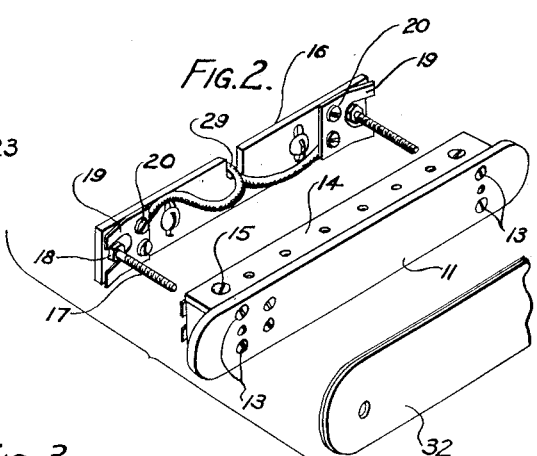
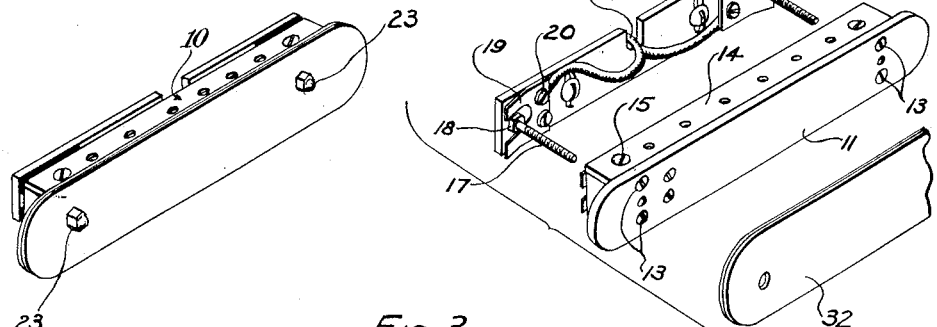
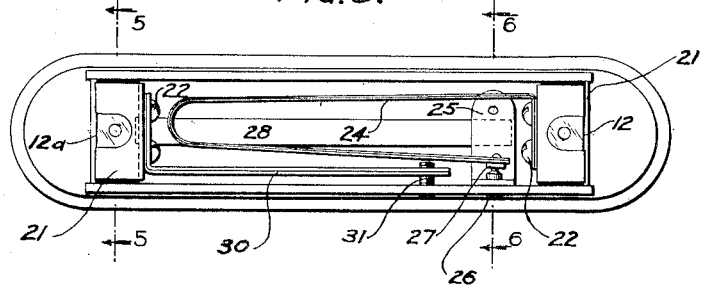
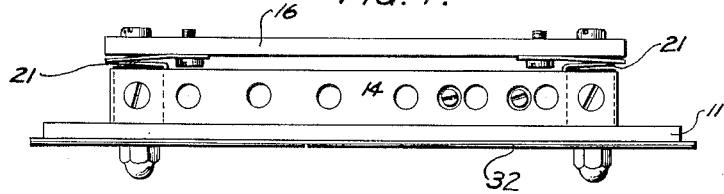
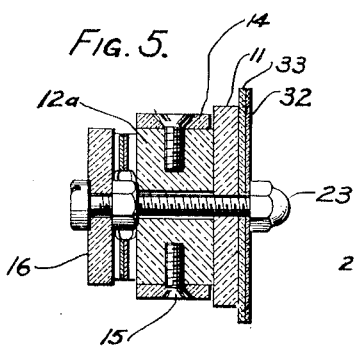
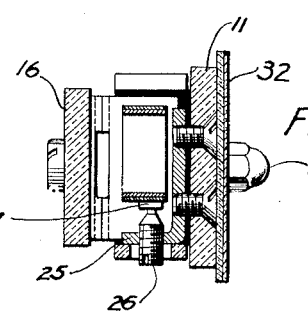
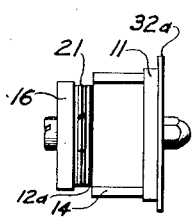
INVENTOR
Hubert S. Turner
BY Kenyon & Kenyon
ATTORNEYS.

Patented Sept. 17, 1940

2,214,843

UNITED STATES PATENT OFFICE 2,214,843

THERMOSTAT

Hubert S. Turner, Brooklyn, N. Y.

Application May 11, 1939, Serial No. 272,952

4 Claims. (Cl. 200—138)

This invention relates to thermostats and has for an object a highly sensitive, quick-responsive thermostat which is of simple construction, low cost and is capable of being easily and quickly dismantled for adjustment or replacement of the thermally sensitive element.

One embodiment of the invention consists essentially of a bracket adapted to be permanently attached to a support and equipped with terminals for establishing electrical connection with the device to be controlled and a box-like casing containing the thermally sensitive unit, together with electrical terminals which automatically cooperate with the terminals on the bracket to complete the control circuit upon assembly of the casing with the bracket. Preferably, the bracket and casing are composed of material which has a low co-efficient of heat absorption and is also an electrical insulator. Quick detachable means are provided for mounting the casing on the bracket so that access may be had to the thermally sensitive element merely by dismounting the casing from the bracket.

Other objects, novel features and advantages of this invention will become apparent from the following specification and accompanying drawing, wherein:

Fig. 1 is a perspective view of a thermostat embodying the invention attached to a room wall;

Fig. 2 is an exploded perspective view of the thermostat;

Fig. 3 is a rear elevation of the thermostat casing;

Fig. 4 is a plan view of the complete thermostat;

Fig. 5 is a section on the line 5—5 of Fig. 3;

Fig. 6 is a section on the line 6—6 of Fig. 3, and

Fig. 7 is an end view of a modification.

A housing 10 consists of a box-like casing and a bracket, the casing being made up of a plate 11 to which are attached a pair of end blocks 12 and 12a by screws 13 and a pair of perforated panels 14 are attached to the blocks 12 by screws 15, the plate, blocks and panels being all composed of a material which has a low co-efficient of heat absorption and which is an electrical insulator. The bracket consists of a plate 16 similar in all respects to the plate 11 and is provided with bolts 17 held in place by nuts 18, the bolts being adapted to pass through apertures in the blocks 12 and 12a. A pair of spring terminal members 19 are attached to the bracket 16 by screws 20, there being a member 19 at each end of the bracket. A spring terminal member 21 is attached to each of the blocks 12 and 12a by screws 22. With the bracket 16 in assembled relation to the casing, the bolts 17 project beyond the outer face of the plate 11 and nuts 23 screwed on to the ends of the bolts 17 hold the casing in place with the spring members 19 contacting the spring members 21.

A bi-metal strip 24 is supported within the body portion from the block 12 by the screws 22 which attach the resilient member 21 to said block. Near the fixed end of the strip 24 is supported a bracket 25 in which is screw-threaded a contact member 26. The strip 24 is provided with a return bend intermediate its ends to arrange its free end in proximity to the adjustable contact member 26 and a contact member 27 is supported by the free end of the strip 24 for co-operation with the adjustable contact member 26. The arrangement of the two portions of the bi-metal strip may be such that the contact 27 moves into engagement with the contact 26 upon temperature decrease and moves out of engagement therewith upon temperature increase or may be such that the contact 27 moves into engagement with the contact 26 upon temperature increase and moves out of engagement therewith upon temperature decrease. The arrangement of the bi-metal strip depends upon the conditions to be governed by operation of the thermostat. A metallic strip 28 electrically connects the bracket 25 to the spring 21 carried by the block 12a.

Electrical conductors 29 leading from the device controlled are connected to the spring members 19. When the bracket 16 is in assembled relation to the casing, the conductors are in electrical connection with the two contacts 26 and 27 by reason of the engagement of the pair of spring members 19 with the pair of spring members 21. Due to the shape of the strip 24, the bending effect resulting from temperature change is multiplied, thus making it quick responsive.

A second bi-metal strip 30 is supported by screws 22 from the block 12a and its free end is provided with an adjustable member 31 of electrically non-conductive material adapted under certain conditions to engage the strip 24 to break the engagement between contacts 26 and 27. The strip 30 is thicker than the strip 24 and so is slower acting. Also, the arrangement of the two metals in this strip is such that upon temperature change, its free end tends to move in the opposite direction to the direction of movement of the free end of the strip 24. Thus, should the device controlled by the thermostat 24 fail to produce sufficient temperature change upon closing of the contacts 26 and 27 to cause the thermostat 24 to operate to disengage the contact 26 from the contact 27 after a predetermined time interval, the thermostat 30 will lift the contact 27 out of engagement with the contact 26.

An ornamental cover of larger area than the plate 11 preferably is provided for attachment to the outer face of such plate. As shown in Figs. 1 to 6, the cover may consist of a plate 32 of transparent material having between it and the plate 11, a correspondingly shaped piece 33 of the same wallpaper as is used on the wall to which the thermostat is attached. Also, as shown in Fig. 7, the cover may consist of a plate 32a of any desired color. The plates 32 and 32a are removably attached to the plate 11 by the nuts 23, the plates having apertures through which the bolts 17 pass.

The thermostat is attached to the wall of a room in horizontal position and thus avoids, the effects of the usual vertical temperature differential. The bracket 16 is permanently attached to the wall and the electrical conductors 29 are permanently attached to the spring terminals 19. The casing is removably supported from the bracket by the bolts 17 and nuts 23 so that it is an extremely simple matter to remove the casing in the event that for any reason the thermostat is functioning improperly and replace it by a casing in which the thermostat is functioning properly. There is no need for adjustment of any electrical connections as the circuit is automatically completed by engagement of the spring terminals 19 and 21 when the casing is attached to the bracket 16. Adjustment of the circuit-closing temperature of the thermostat is effected by rotation of the contact 26 by use of a screw driver to locate its end near to or further away from the contact 27. The adjustment can be made on a bench or the like with the casing removed from the bracket and the thermostat tested so that in the event of the failure of a thermostat for any reason, a new one already in perfect adjustment may be easily and quickly substituted for the defective thermostat.

I claim:

1. A thermostat comprising a housing consisting of a casing and a removable bracket both composed of a material which has a low co-efficient of heat absorption and is an electrical insulator, a pair of resilient members carried by said casing, a second pair of resilient members carried by said bracket, means for attaching said casing to said bracket with a member of each pair contacting a member of the other pair, a bi-metal strip supported at one end by said casing in electrical connection with one resilient member of said second pair, said strip having a return bend intermediate its ends and a contact at its other end, a contact supported by said casing in electrical connection with the second resilient member of said second pair for engagement by the free end of said strip upon temperature change in one direction and a slow-acting thermostat strip supported by said casing, said slow-acting thermostat strip being adapted upon predetermined temperature change in said one direction to at least a predetermined value for a predetermined period of time to bend into engagement with said first strip to disengage said contacts.

2. A thermostat according to claim 1 characterized by having the bi-metal strip arranged to engage said contacts upon temperature decrease and by having the slow-acting thermostat strip arranged upon temperature decrease to bend into engagement with said bi-metal strip.

3. A thermostat comprising a casing, a bi-metal strip supported at one end by said casing and having a return bend intermediate its ends, a contact at its other end, a second contact supported by said casing for engagement by said first contact upon temperature change in one direction, and a slow-acting thermostat strip supported by said casing, said slow-acting thermostat strip being adapted upon temperature change in said one direction to at least a predetermined value for a predetermined period of time to bend into engagement with said first strip to disengage said contacts.

4. A thermostat according to claim 3 characterized by said first thermostat strip being adapted to engage said contacts upon temperature decrease and said slow-acting thermostat strip being also operative upon temperature decrease.

HUBERT S. TURNER.